(12) United States Patent
Kim et al.

(10) Patent No.: US 8,359,627 B2
(45) Date of Patent: Jan. 22, 2013

(54) METHOD AND APPARATUS FOR REALIZING PVR USING HOME NETWORK DEVICE

(75) Inventors: Yong-jun Kim, Yongin-si (KR); Young-chul Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 11/593,521

(22) Filed: Nov. 7, 2006

(65) Prior Publication Data

US 2007/0106762 A1 May 10, 2007

Related U.S. Application Data

(60) Provisional application No. 60/733,799, filed on Nov. 7, 2005.

(30) Foreign Application Priority Data

Jan. 27, 2006 (KR) .................. 10-2006-0009070

(51) Int. Cl.
*H04N 7/173* (2011.01)
*H04N 7/16* (2011.01)

(52) U.S. Cl. .......... 725/142; 725/134; 725/88; 725/102; 348/552; 709/231; 709/219

(58) Field of Classification Search .................. 709/229, 709/226, 203, 220
See application file for complete search history.

(56) References Cited

U.S. PATENT DOCUMENTS

| 6,842,773 | B1* | 1/2005 | Ralston et al. | 709/206 |
| 2001/0052943 | A1* | 12/2001 | Sone | 348/552 |
| 2002/0091848 | A1* | 7/2002 | Agresta et al. | 709/231 |
| 2003/0046437 | A1* | 3/2003 | Eytchison et al. | 709/250 |
| 2004/0158870 | A1* | 8/2004 | Paxton et al. | 725/115 |
| 2006/0075445 | A1* | 4/2006 | O'Kane | 725/100 |
| 2006/0282864 | A1* | 12/2006 | Gupte | 725/89 |
| 2007/0124416 | A1* | 5/2007 | Casey et al. | 709/217 |
| 2007/0157252 | A1* | 7/2007 | Perez | 725/61 |

FOREIGN PATENT DOCUMENTS

| KR | 10-2004-0085890 A | 10/2004 |
| KR | 10-2004-0086916 A | 10/2004 |

* cited by examiner

*Primary Examiner* — Asad Nawaz
*Assistant Examiner* — Jason Harley
(74) *Attorney, Agent, or Firm* — Sughrue Mion, PLLC

(57) ABSTRACT

A method of realizing a personal video recorder (PVR) using a home network device is provided. A client receives contents and replays the contents in a home network. The client uploads first contents received from a real time broadcasting channel to the server from a time when an external time-shift input is received, terminates the uploading of the first contents if an external replay input is received during the uploading of the first contents, replays the first contents whose uploading is terminated from a portion requested by the external replay input, and simultaneously uploads second contents to the server, received from the real time broadcasting channel at a time when the uploading of the first contents is terminated. A user can watch a live broadcast using a time-shift function such as a PVR via a home network device without a separate PVR.

7 Claims, 6 Drawing Sheets

FIG. 4

```
<DIDL-Lite xmlns:dc="http://purl.org/dc/elements/1.1/"
xmlns:upnp="urn:schemas-upnp-org:metadata-1-0/upnp/"
xmlns="urn:schemas-upnp-org:metadata-1-0/DIDL-Lite">
<item id="" restricted="false" temporary="true" duration="1800">
<dc:title>New Track</dc:title>
<upnp:class>
object.item.audioItem.musicTrack
</upnp:class>
<dlna:previtem>
13
</dlna:previtem>
<dlna:nextitem>
-1
</dlna:nextitem>
</item>
</DIDL-Lite>
```

FIG. 5

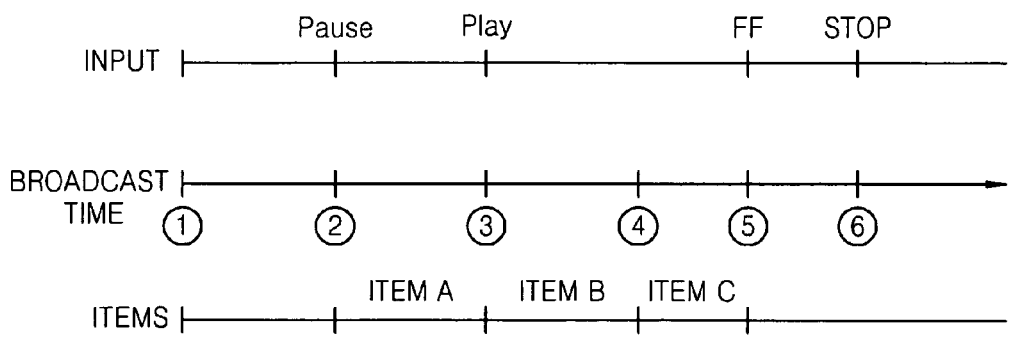

METHOD AND APPARATUS FOR REALIZING PVR USING HOME NETWORK DEVICE

CROSS-REFERENCE TO RELATED PATENT APPLICATIONS

This application claims priority from U.S. Patent Application No. 60/733,799, filed on Nov. 7, 2005 in the U.S. Patent Office and Korean Patent Application No. 10-2006-0009070, filed on Jan. 27, 2006 in the Korean Intellectual Property Office, the disclosure of which are incorporated herein in their entirety by reference.

BACKGROUND OF THE INVENTION

1. Field of the Invention

Methods and apparatuses consistent with the present invention relate to a home network, and more particularly to, a method of processing contents in a home network device.

2. Description of the Related Art

Owing to research and various standardization operations of home network technology, a user can operate a variety of home network devices using a remote control. For example, the user can operate a variety of home network devices such as a personal computer (PC) and digital contents via a television over a home network.

FIG. 1 is a diagram for explaining a related art method of using contents in a home network. The home network is based on a Universal Plug and Play for Audio Video (UPnP AV) architecture, which is applied as described below.

Referring to FIG. 1, a control point (CP) transmits a CreateObject message that requests a content directory service (CDS) of a digital media server (DMS) to generate items in order to upload contents to the media server. The media server generates the items based on parameters included in the CreateObject message. The CP that receives a result of the generation of the items transmits the contents to the media server through an HTTP POST. The media server updates the items of the CDS if the media server receives a last packet of the contents in order to completely upload the contents. After the items of the CDS are updated, the CP calls Browse( ) or Search( ) of the CDS and uses the contents uploaded in the media server.

In detail, according to the related art method, although a user browses the items of the CDS using the CP before the contents are completely uploaded in the media server in the home network, since the user cannot acquire Uniform Resource Locator (URL) information used to access the contents, live broadcast contents are reproduced to upload to the media server, and a time-shift function such as a personal video recorder (PVR) cannot be used.

SUMMARY OF THE INVENTION

The present invention provides a method and apparatus for realizing a PVR using a home network device.

According to an exemplary embodiment of the present invention, there is provided a contents processing method for a client that receives contents and replays the contents in a home network, the method comprising: uploading, to a server, first contents received from a real time broadcasting channel from a time when an external time-shift input is received; and terminating the uploading of the first contents if an external input for replaying a temporal time, which is after the time when the external time shift input is received, is received during the uploading of the first contents.

The may further comprise: replaying the first contents from a portion requested by the external replay input, and simultaneously uploading, to the server, second contents received from the real time broadcasting channel at a time when the uploading of the first contents is terminated.

The method may further comprise: if the uploaded first contents are completely replayed, terminating the uploading of the second contents.

The method may further comprise: replaying the uploaded second contents from the beginning, and simultaneously uploading, to the server, third contents received from the real time broadcasting channel from the time when the uploading of the contents is terminated.

According to another exemplary embodiment, there is provided a computer-readable storage medium having embodied thereon a computer program for executing the above method.

According to another exemplary embodiment of the present invention, there is provided a client that receives contents and replays the contents in a home network, the method comprising: an upload unit performing a first upload by transmitting, to a server, contents received from a real time broadcasting channel from a time when an external time-shift input is received, and, terminating the first upload if an external replay input is received during the first upload; and a replay unit replaying the first upload contents from a portion requested by the external replay input for replaying a temporal time, which is after the time when the external time shift input is received during the first upload.

The upload unit may perform a second upload that transmits, to the server, contents received after the first upload is terminated from the real time broadcasting channel while the replay unit replays the first upload contents.

BRIEF DESCRIPTION OF THE DRAWINGS

The above and other aspects of the present invention will become more apparent by the following detailed description of exemplary embodiments thereof with reference to the attached drawings in which:

FIG. 4 is a diagram of a CreateObject message according to an exemplary embodiment of the present invention;

FIG. 5 is a diagram for explaining operations of a PVR realized according to an exemplary embodiment of the present invention;

DETAILED DESCRIPTION OF EXEMPLARY EMBODIMENTS OF THE INVENTION

The present invention will now be described more fully with reference to the accompanying drawings.

Figure 1:
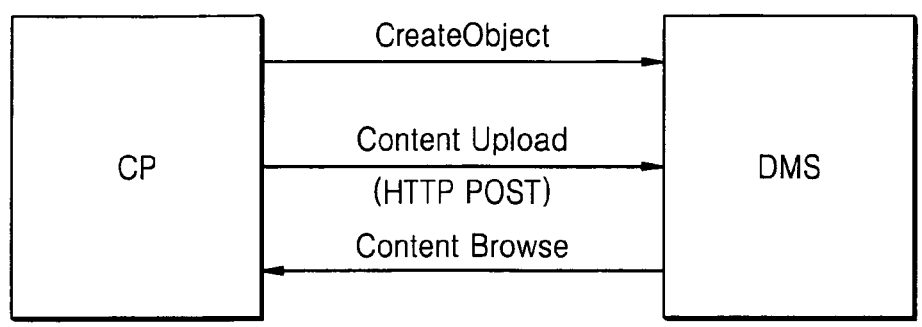
FIG. 1 is a diagram for explaining a conventional method of using contents in a home network.
Figure 2:
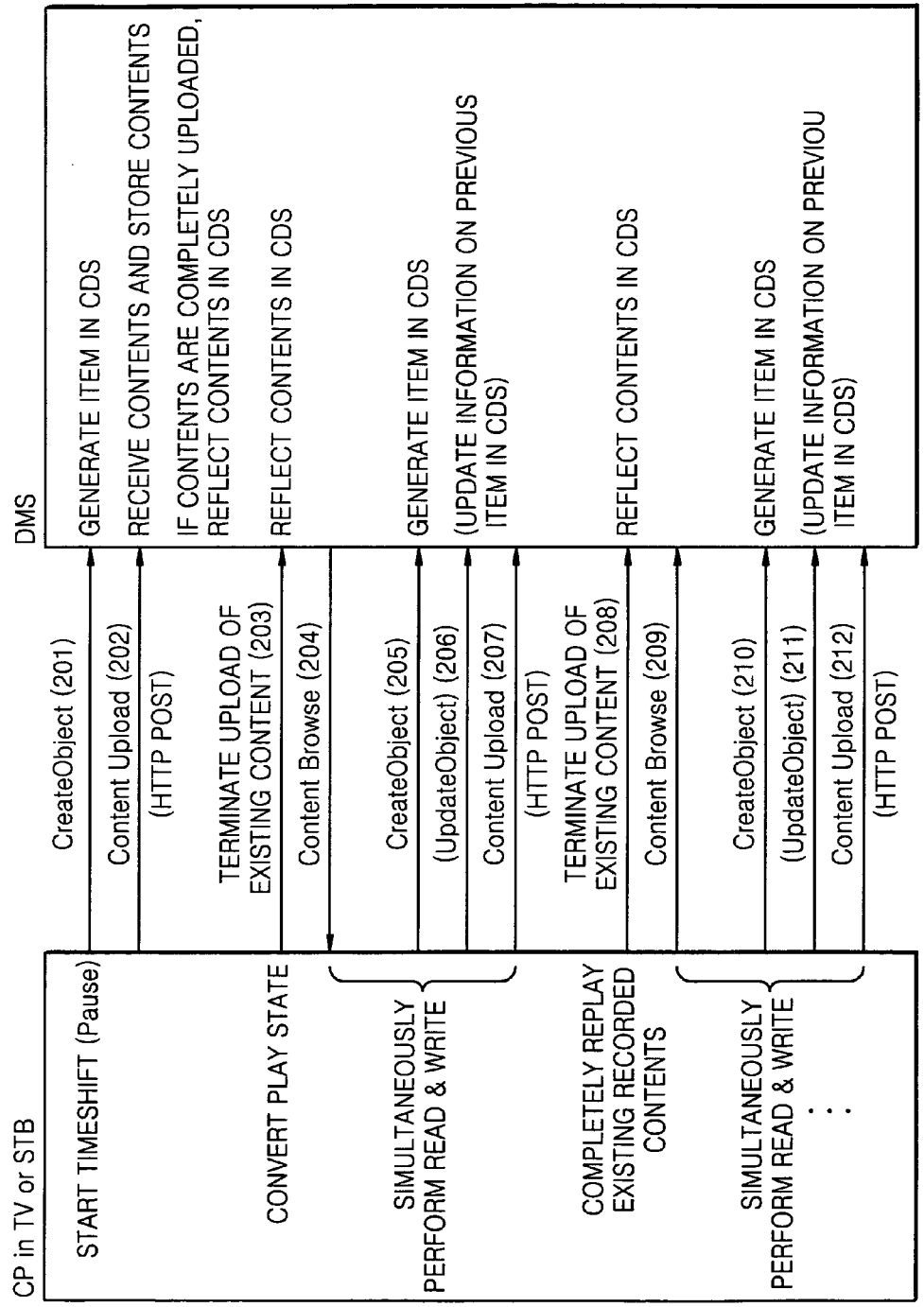
FIG. 2 is a diagram of a method of realizing a PVR using a home network device according to an exemplary embodiment of the present invention.

FIG. 2 is a diagram of a method of realizing a PVR using a home network device according to an embodiment of the present invention. Referring to FIG. 2, if a user pushes a <PAUSE> button of a remote control to start a time-shift while watching a live broadcast using a digital television (TV), the digital TV replays the received live broadcast and contents received by a broadcasting channel are simultaneously uploaded to a media server. If the time-shift is started, a CP of the digital TV requests to the media server to generate items corresponding to the contents to be uploaded (Operation 201) and uploads the received broadcast contents (Operation 202). The digital TV can also replay the received broadcast while the digital TV is uploading the received broadcast contents.

While the digital TV uploads and replays the received broadcasting contents simultaneously, if the user pushes a replay button, the CP terminates uploading of the contents, and the media server reflects the contents, the uploading of which is terminated, in items of a content directory service (CDS) so that the CP can access the completely uploaded contents. If the items of the CDS are updated, the CP browses completely uploaded items (Operation 204), and replays the contents corresponding to one of the browsed items, and uploads broadcasting after the contents uploading is terminated (Operations 205 and 207). Also, the CP can request the media server to include replay sequence information of newly uploaded items in information on the completely uploaded items (Operation 206) in order to reflect a replay sequence of the items. However, when the CP directly manages a replay sequence of each of the items, Operation 206 can be omitted.

If the digital TV completely replays the contents, the uploading of which is terminated, the CP terminates a current uploading of contents (Operation 208) to replay other contents, browses an item (Operation 209), replays the browsed item, and simultaneously resumes uploading of contents (Operations 210, 211, and 212).

Figure 3:
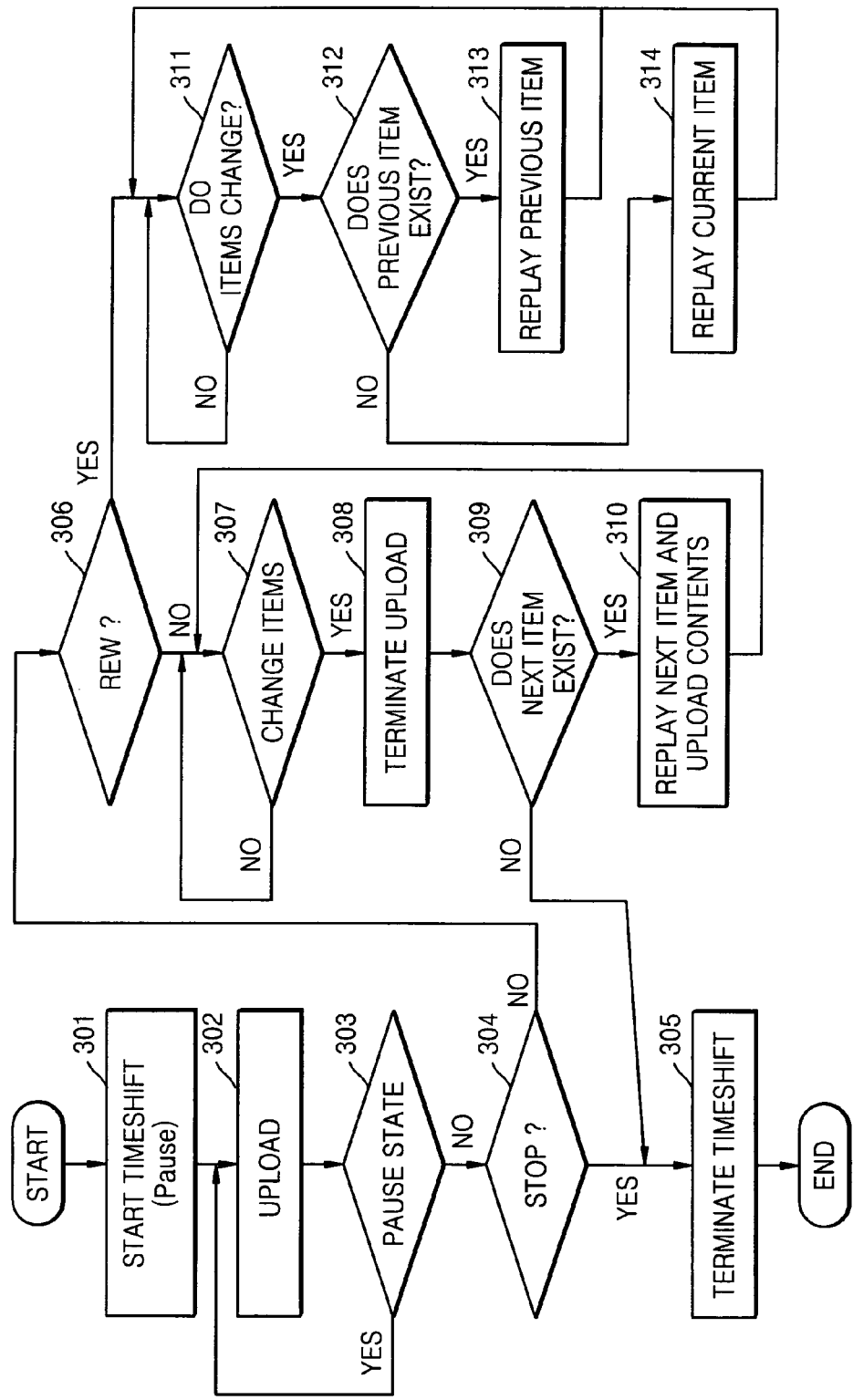
FIG. 3 is a flowchart of a contents processing method used in a UPnP CP according to an exemplary embodiment of the present invention.

FIG. 3 is a flowchart of a contents processing method used in a UPnP CP according to an embodiment of the present invention. Referring to FIG. 3, if a user pushes a <PAUSE> button of a digital TV while watching a live broadcast to start a time-shift (Operation 301), a CP starts uploading (Operation 302). The user pushes a <STOP> button to terminate the time-shift (Operations 304 and 305) and the digital TV replays the live broadcast in real time.

When items change after the user pushes a <REW> button (Operation 306), i.e., when the user shortly pushes the <REW> button to replay a previous item, the digital TV replays the previous item (Operation 313). If items change (YES in Operation 311), i.e., when the user pushes the <REW> button long enough to browse previous content, an operation corresponding to the browsed previous content is performed. If the previous content does not exist (NO in Operation 312), a current item is replayed (Operation 314).

When the user pushes a replay button or a <FF> button to change items, i.e., a button other than the <REW> button (NO in Operation 306), the digital TV terminates current uploading of contents (Operation 308) and simultaneously replays a next item, and then uploads contents received in real time from a broadcasting channel (Operation 310). If the next item does not exist (NO in Operation 309), i.e., a replay time corresponding to the next item is a current time, the digital TV terminates the time-shift (Operation 305) and replays the live broadcast in real time.

FIG. 4 is a diagram of a CreateObject message according to an embodiment of the present invention. In the current embodiment, parameters such as "temporary", "duration", "nextitem", "previtem", etc, are added to the CreateObject message that follows digital living network association (DLNA) guidelines, which will be described now in detail.

First, the parameter "temporary" indicates whether an item is temporal or permanent in the form of item property information. If the parameter "temporary" indicates that the item is temporal, the item must be deleted from a server. If a value of the parameter "temporary" is true, i.e., if the item is temporal, the parameter "duration" indicates a time duration from when the item is generated to when it is terminated. Since a value of the parameter "duration" is 1800 in the current embodiment of the present invention, the server deletes the item after 1800 seconds have elapsed from when the item was generated.

The parameter "previtem" indicates identification information of a previous item to an item generated by the CreateObject message. The parameter "nextitem" indicates identification information of a next item to the item generated by the CreateObject message. The server requires these two parameters to understand a replay sequence of items. If the identification information of the previous or next item of the item does not exist or is unknown, a value of the identification information is replaced with −1 or is omitted. It is common that when the item is generated, the identification information on the next item cannot be unknown. Therefore, the CP can call a UpdateObject action of a CDS of the server and update the identification information on the next item at the time of generating the next item to the item generated by the CreateObject message.

Since a value of the parameter "nextitem" is −1, the next item is not generated. Since a value of the parameter "previtem" is 13, the previous item has a value 13 as its identification information.

FIG. 5 is a diagram for explaining operations of a PVR realized according to an embodiment of the present invention. Referring to FIG. 5, if a user watches a live broadcast via a digital TV from time ① and pushes a PAUSE button of a remote controller at time ②, although a time-shift starts so that a screen of the digital TV is at a standstill at time ②, the digital TV records the broadcast received in real time through a channel and uploads the recorded broadcast to a media server connected over a home network. If the user pushes a replay button of the remote control at time ③, the digital TV terminates uploading the recorded broadcast and replays an item A that is content from time ② to time ③ starting from an initial portion corresponding to time ②. At this time, the digital TV replays the item A and simultaneously starts uploading the broadcast in real time received from time ③.

While the digital TV simultaneously uploads and replays the broadcast, if the digital TV completely replays the item A at time ④, the digital TV terminates uploading the broadcast and resumes uploading a new broadcast, and simultaneously replays an item B from an initial portion corresponding to time ③.

While the digital TV replays the item B, if the user shortly pushes a <FF> button of the remote control to watch a portion corresponding to time ④ at time ⑤, the digital TV terminates uploading the broadcast and replays an item C from an initial portion corresponding to time ④. The digital TV starts to upload the live broadcast received after time ⑤. If the user pushes a STOP button of the remote control at time ⑥, the time-shift is terminated and the digital TV replays the broadcast in real time.

Figure 6:
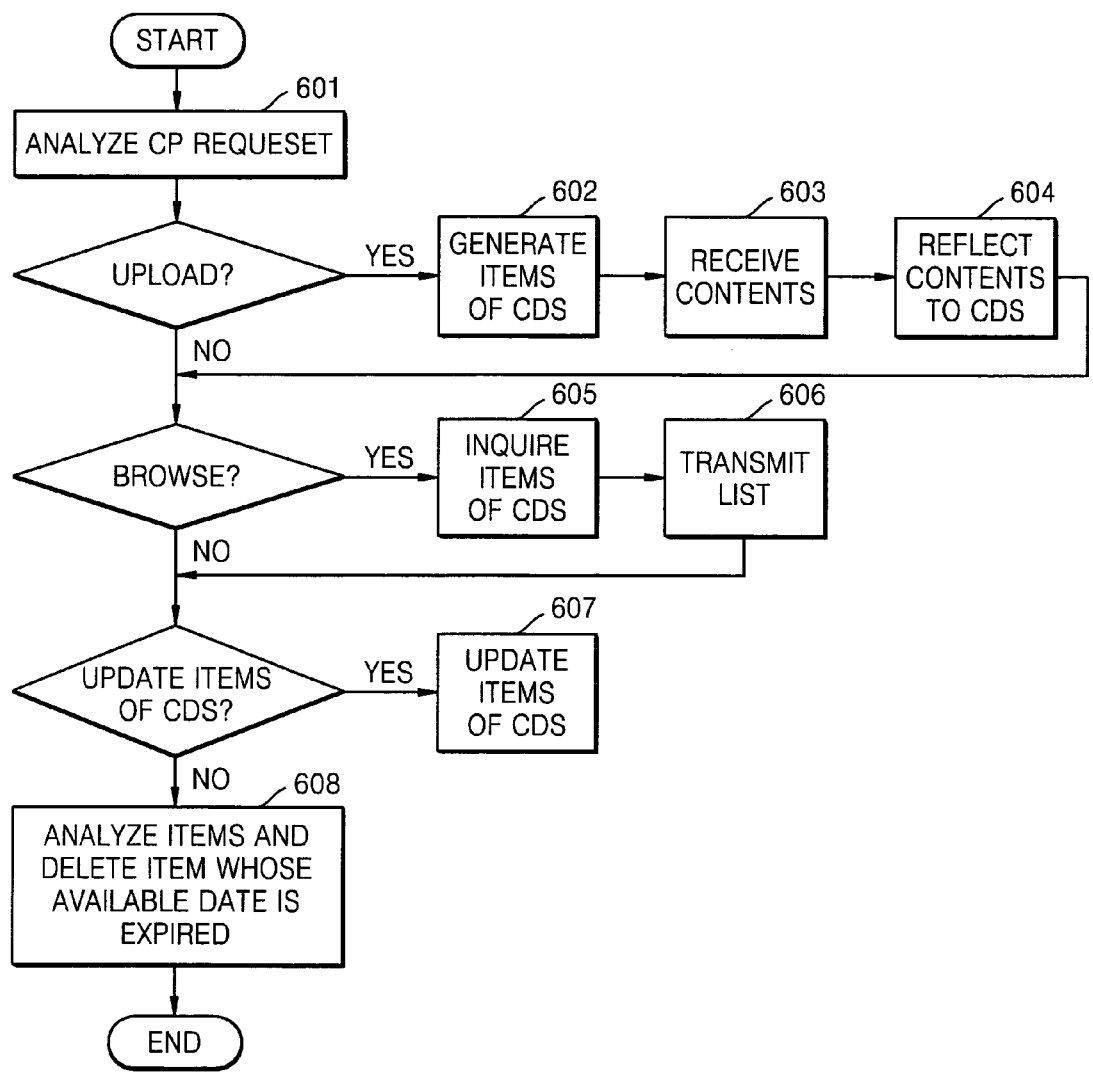
FIG. 6 is a flowchart illustrating operations of a media server according to an exemplary embodiment of the present invention.

FIG. 6 is a flowchart illustrating operations of a media server according to an embodiment of the present invention. Referring to FIG. 6, the media server analyzes a request of a CP (Operation 601), if the CP requests upload, the media server generates an item (Operation 602), receives contents (Operation 603), and if the upload is terminated, reflects a URL of an uploaded contents resource, etc. in information on the item in a CDS (Operation 604).

If the CP requests browsing, the media server inquires about items of a CDS (Operation 605) and transmits a list of completely uploaded items to the CP (Operation 606).

If the CP requests an update of the items of the CDS, i.e., if the CP requests to reflect item identification information on a replay sequence to the items as mentioned above, the media server performs an operation corresponding to the request (Operation 607).

Meanwhile, the media server analyzes the items and deletes items whose available dates have expired according to the value of the parameter "duration" as mentioned above (Operation 608).

Figure 7:
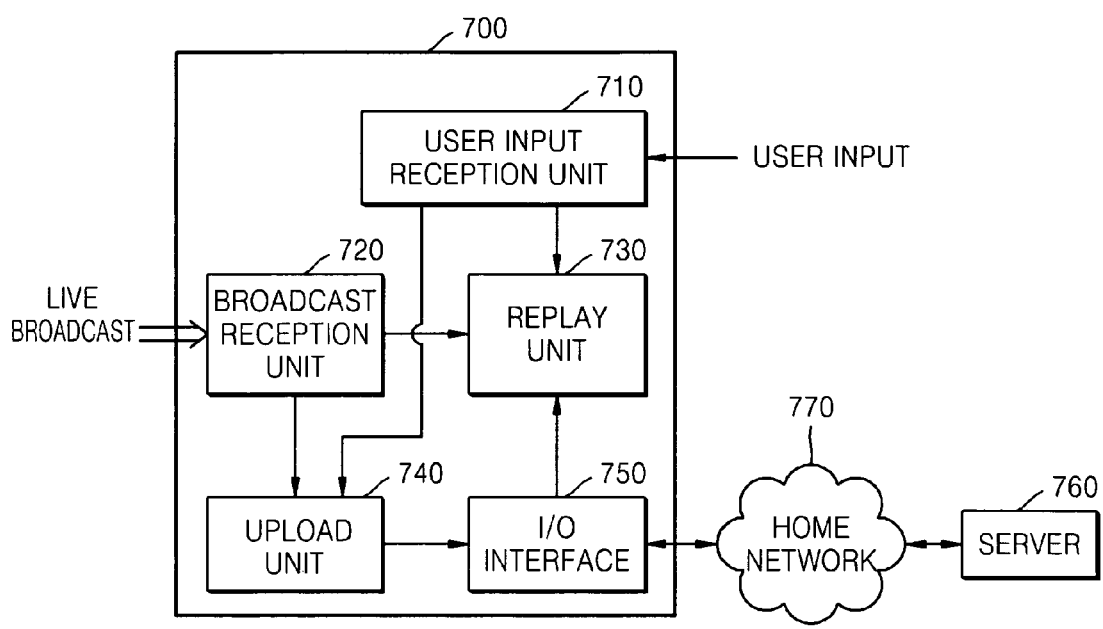
FIG. 7 is a block diagram of a client apparatus according to an exemplary embodiment of the present invention.

FIG. 7 is a block diagram of a client apparatus 700 according to an embodiment of the present invention. Referring to FIG. 7, the client apparatus 700 comprises a CP in a UPnP home network 770, receives contents from a media server 760 and replays the contents, and, in general, is a digital TV.

The client apparatus 700 comprises a user input reception unit 710, a broadcast reception unit 720, a replay unit 730, an upload unit 740, and an I/O interface 750.

The user input reception unit 710 receives a signal according to a user input. The broadcast reception unit 720 receives live broadcast through a wired or wireless channel. The replay unit 730 replays the live broadcast received from the broadcasting reception unit 720 or replays contents received from the server 760. The I/O interface 750 is used to allow the client apparatus 700 to communicate with the server 760 via the home network 770.

The upload unit 740 receives an input for starting a timeshift from the user input reception unit 710, and transmits the live broadcast received from the broadcast reception unit 720 to the server 760 via the I/O interface 750. If the upload unit 740 receives a user input for starting to replay the live broadcast again, the upload unit 740 terminates uploading so that the replay unit 730 receives contents whose uploading is terminated from the server 760 and replays the received contents, and then resumes uploading. In detail, when it is necessary for the upload unit 740 to access a currently uploading item according to a user input through the user input reception unit 710 or when the replay unit 730 completely replays uploaded contents, the upload unit 740 terminates uploading so that the server 760 can reflect a URL of contents to a CDS, and then resumes uploading.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the present invention, a user can watch a live broadcast using a time-shift function such as a PVR via a home network device without a separate PVR.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A contents processing method of a client which receives contents and replays the contents in a UPnP(Universal Plug and Play) network, the method comprising:

starting a first upload of contents of a real time broadcasting channel to a server containing CDS(Content Directory Service) when a pause input is received;

terminating the first upload and controlling the server to create a first CDS object using the uploaded contents if a replay input is received during the uploading;

replaying the first CDS object, and simultaneously starting a second upload, to the server, of contents of the channel from when the terminating occurred; and terminating the second upload, controlling the server to create a second CDS object using the secondly uploaded contents, and replaying the second CDS object from the beginning if the first CDS object is completely replayed, wherein the controlling the server to create second CDS object includes sending a message for calling CreateObject action of the CDS to the server and the message includes a parameter indicating that the first CDS object is a previous item of the second CDS item in a replay sequence of items, and wherein the method further comprises:

starting a third upload of contents received after the second upload is terminated of the channel to the server while replaying the second CDS object, and if an external fast forward input is received while replaying the second CDS object, then terminating the third upload, controlling the server to create a third CDS object using the thirdly uploaded contents, and replaying the third CDS object from the beginning.

2. The method of claim 1, further comprising: replaying the third CDS object, and simultaneously starting a fourth upload of contents received from the real time broadcasting channel to the server from a time when the third upload is terminated.

3. The method of claim 1, further comprising: transmitting, to the server, time information for deleting the first CDS object after a predetermined time has elapsed.

4. A non-transitory computer-readable storage medium having embodied thereon a computer program for executing a contents processing method for a client which receives contents, and replays the contents in a UPnP(Universal Plug and Play) network, the method comprising:

starting a first upload of contents of a real time broadcasting channel to a server containing CDS(Content Directory Service) when a pause input is received;

terminating the first upload and controlling the server to create a first CDS object using the uploaded contents if a replay input is received during the uploading;

replaying the first CDS object, and simultaneously starting a second upload, to the server, of contents of the channel from when the terminating occurred; and terminating the second upload, controlling the server to create a second CDS object using the secondly uploaded contents, and replaying the second CDS object from the beginning if the first CDS object is completely replayed, wherein the controlling the server to create second CDS object includes sending a message for calling CreateObject action of the CDS to the server and the message includes a parameter indicating that the first CDS object is a previous item of the second CDS item in a replay sequence of items, and wherein the method further comprises:

starting a third upload of contents received after the second upload is terminated of the channel to the server while replaying the second CDS object, and if an external fast forward input is received while replaying the second CDS object, then terminating the third upload, controlling the server to create a third CDS object using the thirdly uploaded contents, and replaying the third CDS object from the beginning.

5. A client that receives contents and replays the contents in a UPnP(Universal Plug and Play) network, the client comprising:
- an upload unit which starts a first upload by transmitting contents received from a real time broadcasting channel to a server containing CDS(Content Directory Service) when an external pause is received, terminates the first upload and controls the server to create a first CDS object using the firstly uploaded contents if an replay input is received during the first upload; and
- a replay unit which replays the first CDS object when the external replay input is received,
- wherein if the replay unit completely replays the first CDS object, the upload unit terminates the second upload and controls the server to create a second CDS object using the secondly uploaded contents, and the replay unit replays the second CDS object from the beginning,
- wherein the upload unit controls the server to create second CDS object by sending a message for calling CreateObject action of the CDS to the server and the message includes a parameter indicating that the first CDS object is a previous item of the second CDS item in a replay sequence of items,
- wherein the upload unit starts a third upload of contents received after the second upload is terminated of the channel to the server while the replay unit replays the second CDS object, and
- wherein, if an external fast forward input is received while the replay unit replays the second CDS object, the upload unit terminates the third upload and controls the server to create a third CDS object using the thirdly uploaded contents, and the replay unit replays the third CDS object from the beginning.

6. The client of claim 5, wherein the upload unit starts a fourth upload, to the server, of the contents received from the real time broadcasting channel from the time when the third upload is terminated, while the replay unit replays the third CDS object.

7. The client of claim 5, further comprising: an information transmission unit transmitting, to the server, time information for completely deleting the first CDS object after a predetermined time has elapse.

* * * * *